United States Patent [19]
Yoshida

[11] Patent Number: 5,406,555
[45] Date of Patent: Apr. 11, 1995

[54] CHARGING IN LAN FOR ONLY PACKETS USED BY SUBSCRIBERS

[75] Inventor: Atsushi Yoshida, Tokyo, Japan
[73] Assignee: NEC Corporation, Tokyo, Japan
[21] Appl. No.: 84,606
[22] Filed: Jul. 1, 1993
[30] Foreign Application Priority Data
 Jul. 1, 1992 [JP] Japan .................. 4-197863
[51] Int. Cl.$^6$ .......................................... H04L 12/14
[52] U.S. Cl. .................... 370/60; 370/94.1; 379/111; 379/112; 379/113; 379/114; 379/121
[58] Field of Search ............. 370/85.13, 85.14, 60, 370/94.1, 110.1; 379/111–114, 133, 121, 134, 137, 139

[56] References Cited

U.S. PATENT DOCUMENTS

| | | | |
|---|---|---|---|
| 4,879,742 | 11/1989 | Taniguchi et al. | 379/111 |
| 4,933,931 | 6/1990 | Kokubo | 370/60 |
| 5,007,048 | 4/1991 | Kowalk | 370/60 |
| 5,065,393 | 11/1991 | Sibbit et al. | 370/58.2 |

Primary Examiner—Douglas W. Olms
Assistant Examiner—Russell W. Blum
Attorney, Agent, or Firm—Sughrue, Mion, Zinn, Macpeak & Seas

[57] ABSTRACT

In order to individually charge subscribers of a local area network (LAN) or LAN's, a charging apparatus is used in the LAN or in bridge apparatus interconnecting the LAN's to accumulate charges by counting subscriber packets transmitted therethrough as transmission packets additionally including particular packets for use regardless of intentions of the subscribers and includes a memory section in which type field values are preliminarily stored to indicate the particular packets. For one of the transmission packets, an address memory area is loaded with source and destination addresses included in the packet under consideration. A field value memory area is loaded with a type field value included in the packet in question. When the type field value coincides in the memory area and in the memory section, address combinations of such source and destination addresses are accumulated in an address accumulating memory as those included in the subscriber packets with the particular packets excluded from the transmission packets. Counts are accumulated in correspondence to the address combinations as the charges. Each time when an address combination coincides in the memory area and in the memory, one is added to the counts in correspondence to the address combination in question. If not yet included, an address combination in the memory area is additionally accumulated in the memory as a new entry.

10 Claims, 3 Drawing Sheets

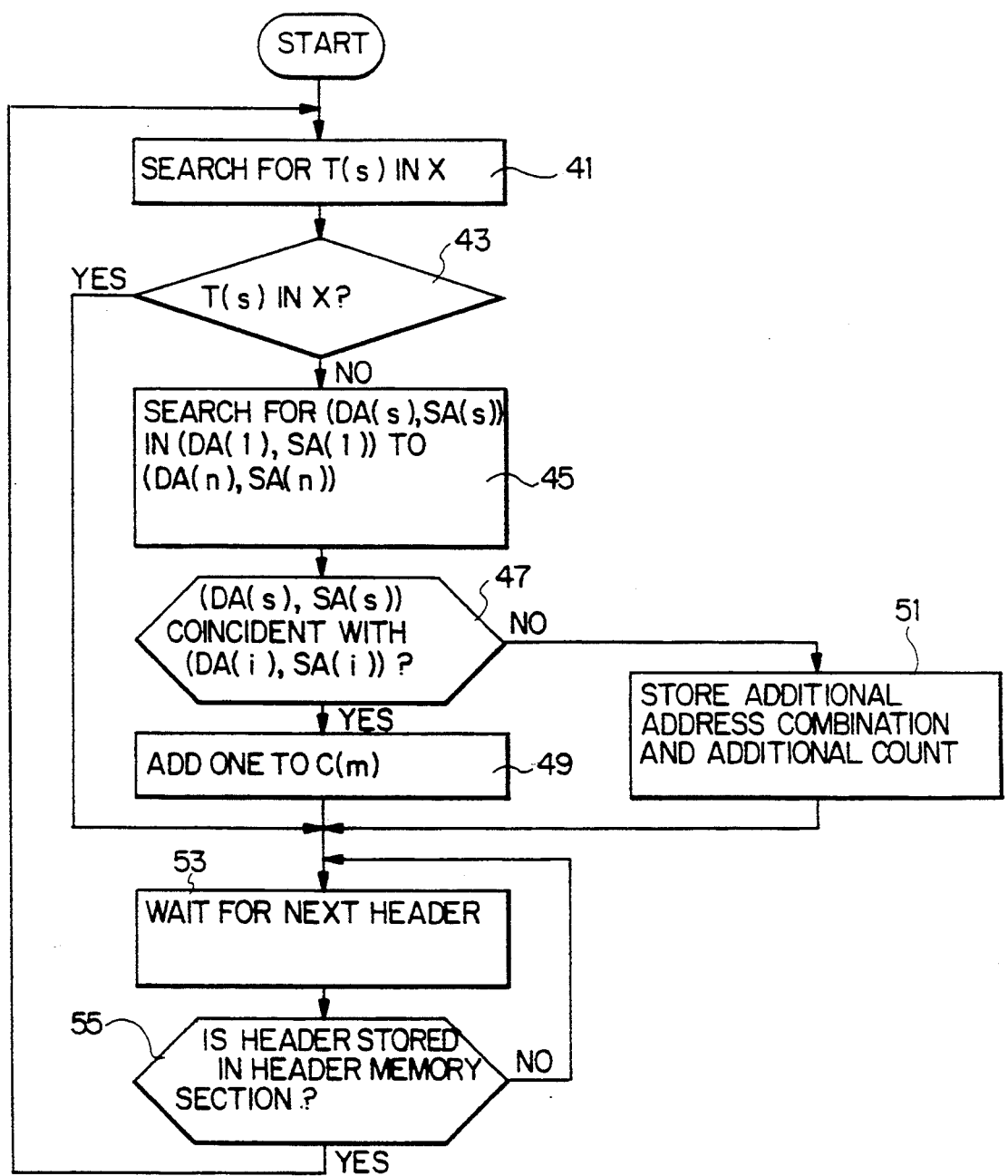

CHARGING IN LAN FOR ONLY PACKETS USED BY SUBSCRIBERS

BACKGROUND OF THE INVENTION

This invention relates to a charging apparatus for use either in a local area network (LAN) or in a bridge apparatus interconnecting a plurality of local area networks.

Local area networks are recently more and more widely used. As a consequence, a bridge and a router have come into practical use in connecting the local area networks together into an internetwork. Various protocols are concurrently used in a network layer of the local area networks. Typical examples of the protocols used in the network layer are transmission control protocol/internet protocol (TCP/IP).

Under the circumstances, a multiprotocol router is developed in order to simultaneously deal with a plurality of protocols. A brouter is also developed as a particular bridge for a link layer alone so as to cope with packets which can not be processed in the network layer. An arrangement for interconnecting the local area networks, such as the bridge, the router, or the brouter, is herein called a bridge apparatus.

Along with a wider use of the local area networks, it has become practice to put the internetwork in operation on a commercial basis. In such a situation, a charging apparatus has become necessary for use either in the local area network or in a bridge apparatus in individually charging subscribers or users of the local area network or networks in connection with packets transmitted as transmission packets either through the local area network or through the bridge apparatus. Merely for simplicity of the description, it is possible to refer to a combination of local area networks and a bridge apparatus simply as a local area network. This is because the bridge apparatus is used in merely interconnecting the local area networks and because it is possible in general to refer to a plurality of devices collectively as a device.

A charging apparatus is already known for use in a router. In this conventional charging apparatus, source or originating addresses and destination addresses are identified in the network layer. Charges are accumulated in connection with the subscribers and in consideration of other data, such as distances of transmission of the packets and time periods used in communications.

Such a charging apparatus for the router is defective. This is because the charges are accumulated in connection with information available in the network layer. This conventional charging apparatus is therefore inoperative in the brouter.

It might be possible to remove the defect if the charges could be accumulated by identifying the subscribers by the use of addresses in the link layer, such as source addresses in the link layer. Such a source address is included in a header of an ethernet packet. Use should additionally be made of a destination address included in the header. The source and the destination addresses of the header are, however, used in a media access control (MAC) layer known in the art. As a result, the charging apparatus is again defective for the reasons which will be described in the following.

In the media access control layer, some of the packets are transmitted regardless of intentions of the subscribers, namely, without relation to communications intensionally exchanged among the subscribes. Such packets will herein be called particular packets. For example, host computers of the local area networks transmit and receive the particular packets in recognizing their network addresses in one another. Such a particular packet is formed in accordance with either an address or forward address resolution protocol (ARP) or a reverse address resolution protocol (RARP). It is undesirable to charge the subscribers for these particular packets.

SUMMARY OF THE INVENTION

It is consequently an object of the present invention to provide a charging apparat us which is for use in a local area network or in a bridge apparatus interconnecting a plurality of local area networks and which can correctly charge subscribers of the local area network or networks for communications exchanged among the subscribers.

It is another object of this invention to provide a charging apparatus which is of the type described and which can duly accumulate charges for the subscribers in connection only with subscriber packets used in communications among the subscribers by excluding, from transmission packets transmitted through the charging apparatus, particular packets inevitably used in addition to the subscriber packets with no relation to the communications.

Other objects of this invention will become clear as the description proceeds.

According to this invention, there is provided a charging apparatus which is for use in a local area network used by a plurality of subscribers, through which transmission packets are transmitted, and which comprises: (A) locating means for locating particular packets in the transmission packets; (B) specifying means connected to the locating means for specifying subscriber packets by excluding the particular packets from the transmission packets and (C) charge accumulating means related to the specifying means for accumulating charges in connection with the subscribers by counting the subscriber packets.

BRIEF DESCRIPTION OF THE DRAWING

FIG. 4 is a flow chart for use in describing operation of the charging apparatus illustrated in FIG. 1.

DESCRIPTION OF THE PREFERRED EMBODIMENT

Figure 1:
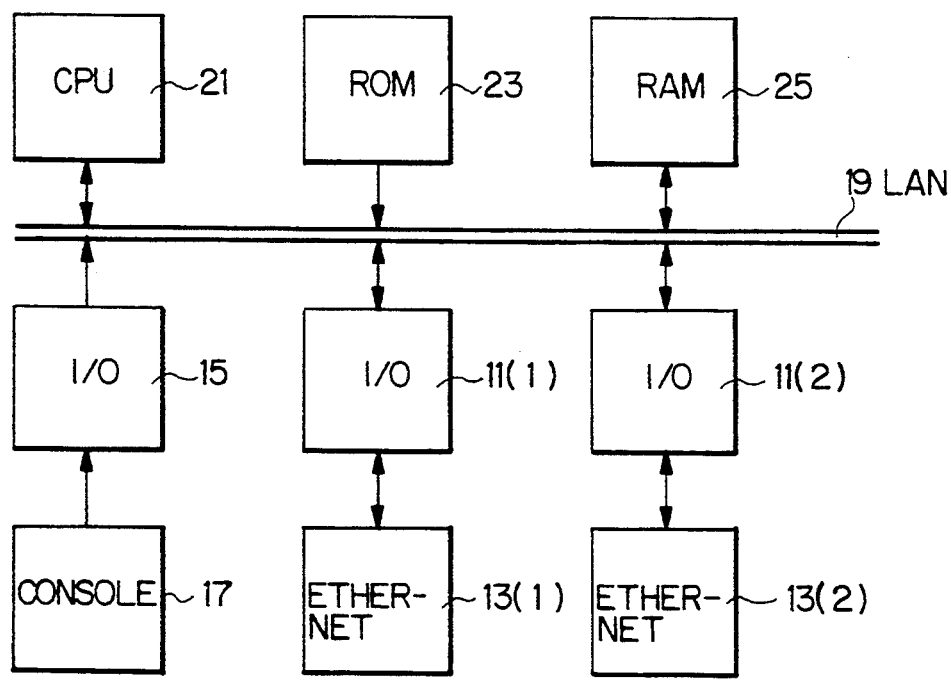
FIG. 1 is a block diagram of a charging apparatus which is structured according to an embodiment of the instant invention and is used in a bridge apparatus interconnection two local area networks.

Referring to FIG. 1, attention will be directed to a charging apparatus according to a preferred embodiment of the present invention. In the example being illustrated, the charging apparatus is used in a bridge apparatus which connects first and second local area networks (LAN's) together and is for individually charging subscribers or users of the local area networks.

When only one of the local area networks is taken into consideration rather than a combination of the bridge apparatus and such a plurality of local area networks interconnected by the bridge apparatus, the charging apparatus is used in the local area network under consideration. Alternatively, it is possible to refer, simply as a local area network, to a combination of a plurality of local area networks and a bridge apparatus interconnecting the local area networks.

In FIG. 1, first and second input/output control (I/O) units 11(1) and 11(2) are connected to first and second ethernets 13(1) and 13(2). First and second combinations of the input/output control units 11 (suffixes omitted) and the ethernets 13 (suffixes likewise omitted) are used in the first and the second local area networks. It should be known in connection with the description made heretobefore that the host computers are used in the first and the second local area networks in the manner known in the art and consequently are not illustrated.

The bridge apparatus comprises an apparatus input/output control unit 15 connected to a console 17 for use in common to the subscribers of the first and the second local area networks. The first the second, and the apparatus input/output control units 11 and 15 are connected to a bus 19 which is common to the local area networks and the bridge apparatus.

Each subscriber uses one of the first and the second local area networks as a particular network, as called for the time being, and is assigned with a network address. Such a subscriber sends, as an originating subscriber, originating information to the particular network for reception by a different subscriber who uses either the particular network or the other of the first and the second local area networks. The originating subscriber may receive arriving information through the particular network. The originating and the arriving information is transmitted through the ethernet 17 of the particular network as originating and arriving ethernet packets.

The network address of the originating subscriber is called a source address. The network address of the different subscriber is called a destination address. In the local area networks in general, the destination and the source addresses and the originating and the arriving information are represented in accordance with network layer protocols. Typical examples of the network layer protocols are transmission control protocol/internet protocol (TCP/IP).

The bus 19 transmits the ethernet packets therethrough and through the charging apparatus as transmission packets. When representative of the originating or the arriving information, a transmission packet is herein called a subscriber packet. In the manner described hereinabove, the host computers exchange similar packets through the bus 19. These packets are referred to herein as particular packets and are formed in accordance with particular protocols, such as a forward address resolution protocol (ARP) and a reverse address resolution protocol (RARP).

Figure 2:
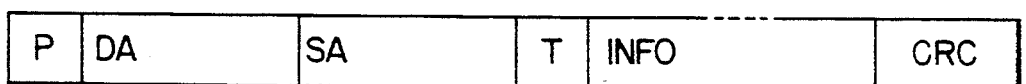
FIG. 2 shows a frame format of an ethernet packet transmitted through the charging apparatus depicted in FIG. 1.

Turning to FIG. 2 during a short while, each ethernet packet includes a header. More particularly, each ethernet packet has a frame format comprising a preamble P, a destination address field DA, a source address field SA, a type field T, an information field INFO, and a cyclic redundancy check code CRC. The destination address field through the type field collectively serve as the header in the example being illustrated.

The destination address field represents the destination address. The source address field indicates the source address. Each of the destination and the source addresses is called an address datum and may be six octets or bytes long. The type field is two octets long and represents one of various type field values which are indicative of the protocols used in forming the frame format. For example, the forward address resolution protocol is identified by a type field value representative of a hexadecimal integer 0806.

The information field is for an information datum representative of the originating or the arriving information. The information datum is from 46 to 1,500 octets long. The cyclic redundancy check code is four octets long and is used in the manner known in the art in checking an error which may happen to be present in the frame format.

When included in the header of the ethernet packet, the destination and the source addresses are alternatively called header destination and source addresses. When included in the header of the ethernet packet, the type field value is similarly called a header field value. When included in the header of the particular packet, the type field value is called a particular field value.

Turning back to FIG. 1, the console 17 is put in operation by an attendant to the charging apparatus to produce the particular field values. In the charging apparatus, a central processing unit (CPU) 21, a read only memory (ROM) 23, and a random access memory (RAM) 25 are connected to the bus 19. For use in putting the central processing unit 21 in operation of individually charging the subscribers of the first and the second local area networks in the manner which will become clear as the description proceeds, a program and data are preliminarily stored in the read-only memory 23. As will shortly be described, charges are accumulated in the random access memory 25 in connection with the respective subscribers.

Figure 3:
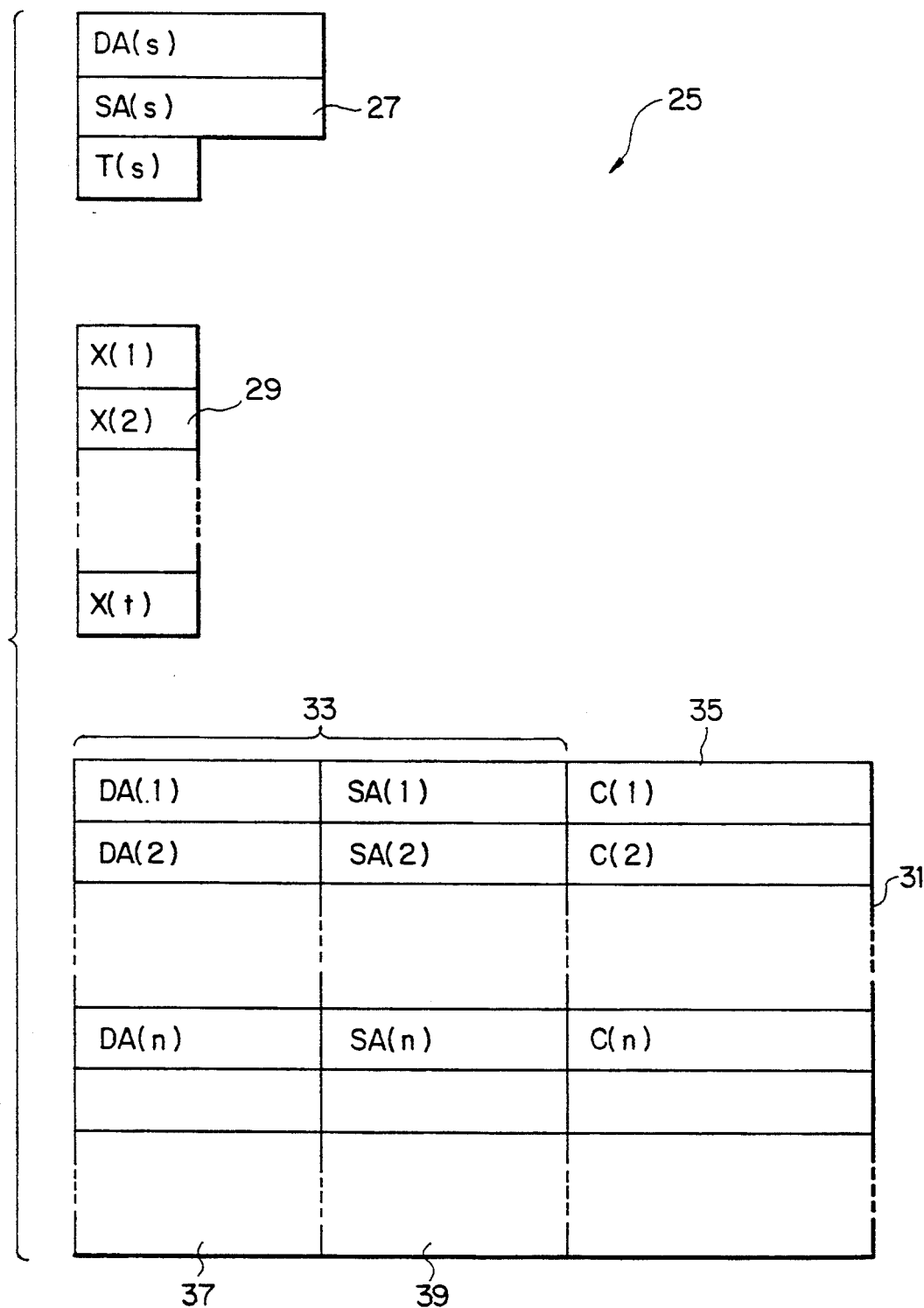
FIG. 3 is a block diagram of a random access memory for use in the charging apparatus shown in FIG. 1.

Turning to FIG. 3, the random access memory 25 has a header memory section 27, a condition entry section 29, and a count or charge accumulating section 31. In the manner which will presently be described, the header memory section 27 comprises a header destination address memory area, a header source address memory area, and a header field value memory area. A combination of the header destination and source address memory areas will be called an address memory area.

The count accumulating section 31 comprises an address accumulating memory 33 and a charge or count accumulating memory 35. The address accumulating memory 33 comprises a memory destination address area 37 and a memory source address area 39.

FIGS. 1 through 3 will be referred to. Extracted by one of the first and the second input/output control units 11 from one of the ethernet packets that is currently supplied to the bus 19 for transmission through the bus 19 as a transmission packet, the header is stored in the header memory section 27. More particularly, the header destination address is stored in the header destination address memory area as a stored destination address DA(s). The header source address is stored in the header source address memory area as a stored source address SA(s). The header field value is stored in the header field value memory area as a stored field value T(s).

The stored destination and source addresses will collectively be called a stored address datum. Inasmuch as extracted from the header of one of the ethernet packets under consideration, the stored field value is alternatively referred to as an extracted field value depending on the circumstances.

When preliminarily successively produced by the console 17 and extracted by the apparatus input/output control unit 15, the particular field values are stored in the condition entry section 29 as first through t-th entry field values X(1), X(2), ..., and X(t), where t represents the number of particular field values and may be equal to ten. When indicated as one of the particular field values, the hexadecimal integer 0806 is stored in the condition entry section 29 as one of the entry field values X (suffixes omitted).

Referring to FIG. 4 in addition to FIGS. 1 through 3, it will be presumed that the condition entry section 29 is already loaded with the entry field values X. It will furthermore be presumed that the header is extracted by one of the first and the second input/output control units 11 and is stored in the header memory section 27.

Controlled by the program and the data stored in the read-only memory 23, the central processing unit 21 starts its operation of accumulating the charges or counts in the charge accumulating memory 35 with the subscriber packets counted as follows.

At a first step 41, the central processing unit 21 searches for the stored field value T(s) among the entry field values X. At a second step 43, the central processing unit 21 checks or tests whether or not the stored field value coincides with one of the entry field values as a coincident field value. This one of the entry field values may be whichever of the entry field values.

It will first be assumed that the stored field value is not included in the entry field values and is therefore not identified as a coincident field value which is one of the entry field values that coincides with the stored field value. In this event, the central processing unit 21 stores as will presently be described the stored destination and source addresses DA(s) and SA(s) in the memory destination address area 37 as a memory destination address and in the memory source address area 39 as a memory source address.

It will be surmised that the central processing unit 21 has dealt with first through n-th ethernet packets which have consecutively passed through the bus 19, where n represents a positive integer which grows with time. Under the circumstances, an address combination of the stored destination and source addresses is accumulated in the address accumulating memory 33 as one of address combinations of such destination and source addresses.

More specifically, first through n-th memory destination addressed DA(1) to DA(n) and first through n-th memory source addresses SA(1) to SA(n) are stored in the address accumulating memory 33 as first through n-th accumulated address data (DA(1), SA(1)) to (DA(n), SA(n)). In the example being illustrated, the address accumulating memory 33 may have from fifty to sixty address data memory areas for such accumulated address data.

In the manner which will shortly become clear, first through n-th accumulated counts C(1) to C(n) are stored in the charge or count accumulating memory 35 in correspondence to the first through the n-th accumulated address data. The accumulated counts represent charges which should be charged to the subscribers for communications transmitted by the subscribers through the local area network or networks. Distances of the communications are specified by the accumulated address data. It is readily possible to make each charge depend on a communication interval during which one of the subscribers continues its communication. At an end of each charging period, such as a month, the accumulated address data and counts may either be refreshed or continuously accumulated.

Attention will be directed to an i-th memory source address SA(i) of the memory source addresses SA(1) to SA(n), where i may represent whichever of 1 through n. The i-th memory source address corresponds to an i-th subscriber address which identifies an i-th subscriber of the first or the second local area network. The accumulated address data consequently include subscriber addresses of the subscribers if the accumulated address data are continuously accumulated. In such an event, the accumulated address data specify the subscriber packets with the particular packets excluded from the transmission packets.

On so accumulating the accumulated address data in the address accumulating memory 33 and the accumulated charges in the charge accumulating memory 35, the central processing unit 21 searches at a third step 45 for a stored address datum (DA(s), SA(s)) of the stored destination and source addresses among the first through the n-th accumulated address data. At a fourth step 47, the central processing unit 21 checks whether or not the stored address datum is present in the address accumulating memory 33 as a specific one of the accumulated address data that coincides with the stored address datum under consideration.

If one of the accumulated address data is found as such a specific one thereof at the fourth step 47, the central processing unit 21 adds one to one of the accumulated counts C(1) through C(n) that corresponds to the specific one of the accumulated address data as a specific charge or count at a fifth step 49.

If the stored address datum is not found at the fourth step 47 in the address accumlating memory 33, the central processing unit 21 additionally accumulates at a sixth step 51 the stored address datum in question in the address accumulating memory 33 as an additional address datum in addition to already accumulated ones of the accumulated address data. At the same time, the central processing unit 21 stores zero as an additionally accumulated charge or count in the charge accumulating memory 35 in correspondence to the additional address datum. Alternatively, the central processing unit 21 may store one in place of zero as the additionally accumulated charge.

Either when the specific charge is updated in the charge accumulating memory 35 in the manner described before or when the additional address datum is added to the accumulated address data in the address accumulating memory 33 with addition of the additionally accumulated charge in the charge accumulating memory 35 to the accumulated charges in the manner described above, the central processing unit 21 waits at a seventh step 53 for storage of the header of a new transmission packet in the header memory 27. When the central processing unit 21 judges at an eighth step 55 that the header in question is not yet stored in the header memory section 27, the central processing unit 21 repeats the seventh step 53.

When the central processing unit 21 judges at the seventh step 53 that the header memory section 27 is loaded with the header of one of the transmission packets that immediately follows the transmission packet which has been dealt with, the central proessing unit 21 again carries out the first step 41. In this manner, the address accumulating memory 33 and the charge accumulating memory 35 are loaded with the accumulated address data and with the accumulated charges.

It will next be assumed that the central processing unit 21 finds at the second step 43 that the stored field value T(s) is included in the entry field values X and is therefore the coincident field value. In this event, the central processing unit 21 carries out the seventh step 53 and an eight step 55 in the manner described in the foregoing.

Reviewing FIGS. 1 through 4, it is now understood that the charging apparatus comprises a combination of the central processing unit 21 controlled by the read-only memory 23, the header memory section 27, and the condition entry section 29 as a locating arrangement for locating particular packets in the transmission packets. The address accumulating memory 33 serves as a specifying arrangement connected to the locating arrangement to specify subscriber packets among the transmission packets by excluding the particular packets from the transmission packets. The charge accumulating memory 35 serves as a charge accumulating arrangement related to the specifying arrangement to accumulate charges by counting the subscriber packets individually in connection with the subscribers.

In the locating arrangement, the condition entry section 29 serves as a memory section in which particular field values X are preliminarily stored or accumulated. The header memory section 27 serves as an extracting arrangement for extracting the type field value, as an extracted field value, from one of the transmission packets that is currently transmitted as a current packet through the charging apparatus. The central processing unit 21 serves under the circumstances as a finding arrangement connected to the memory section 29 and to the extracting arrangement for finding each of the particular packets in the transmission packets when the extracted field value coincides with one of the particular field values.

In the extracting arrangement, a field value memory area of the header memory section 27 is loaded with the extracted field value as a stored field value T(s). In the finding arrangement, a comparing arrangement is depicted as the second step 43 and is connected to the memory section 29 and to the field value memory area to compare the stored field value with the particular field values and to identify the stored field value as a coincident field value when the stored field value coincides with of the particular field values. When the stored field value is the coincident field value, the comparing arrargement serves in the finding arrangement as an excluding arrangement connected to the comparing arrangement for excluding, from the transmission packets, particular ones of the transmission packets by finding the particular ones of the transmission packets as the particular packets when each of the particular ones of the transmission packets includes the coincident field value.

In the specifying arrangement, a combination of the header destination and source address memory areas of the header memory section 27 serves as an address memory area in which a header address datum of the current packet is stored as a stored address datum (DA(s), SA(s)). The address accumulating memory 33 is connected to the comparing arrangement 43 and to the address memory area and accumulates, when the stored field value is not the coincident field value, the stored address datum as one of the accumulated address data (DA(1), SA(1)) to (DA(t), SA(n)) that includes one of the subscriber addresses. The address accumulating memory 33 thereby specifies, as the particular packets, transmission packets that do not include the accumulated address data.

In the charge accumulating arrangement, an additional comparing arrangement is depicted as the fourth step 47 and is connected to the address memory area of the header memory section 27 and to the address accumulating memory 33 to compare, when the stored field value is not the coincident field value, the stored address datum with the accumulated address data and to identify the stored address datum as a specific one of the accumulated address data that coincides with the stored address datum. The charge accumulating memory 35 is related to the address accumulating memory 33 and is connected to the additional comparing arrangement 47. In the charge accumulating memory 35, accumulated counts C(1) through C(n) of the subscriber packets are accumulated as the charges in correspondence to the accumulated address data. On so accumulating such accumulated counts, the central processing unit 21 adds, each time when the additional comparing arrangement 47 identifies the stored address datum as the specific one of the accumulated address data, an additional count of one to one of the accumulated counts that corresponds to the specific one of the accumulated address data.

It will now be presumed that the current packet is a subscriber packet and is processed at the fourth and the fifth steps 47 and 49. Meanwhile, a different packet may be transmitted through the charging apparatus as one of the transmission packets. In such an event, it is preferred that the header of the different packet should immediately be stored in an additional header memory section and that the seventh step 53 should individually be carried out in connection with the header memory section 27 being illustrated and in connection with the additional header memory section. As a consequence, the random access memory 25 preferably comprises such header memory sections, as 27, of a small number which may be equal to two or three.

While this invention has thus far been described in specific conjunction with a single preferred embodiment thereof, it will now be readily possible for one skilled in the art to put this invention into practice in various other manners. For example, it is possible to use a radio channel as a bus, such as 19, which connects the input/output control units of a plurality of local area networks either individually or collectively to the bus 19 of the charging apparatus. In such an event, the bus 19 of the charging apparatus should receive the transmission packets from the radio channel or channels interconnecting the local area networks.

What is claimed is:

1. A charging apparatus which is for use in a local area network used by a plurality of subscribers and through which transmission packets are transmitted, said transmission packets including address data, said subscribers being identified by subscriber addresses, and said charging apparatus comprising:

locating means for locating particular packets in said transmission packets,
wherein said locating means comprises a memory section in which particular field values are preliminarily stored, extracting means for extracting a type field value from each of said transmission packets as an extracted field value, and finding means connected to said memory section and to said extracting means for finding each of said particular packets in said transmission packets when said extracted field value coincides with one of said particular field values, wherein said extracting means comprises a field value memory area in which said extracted field value is stored as a stored field value, wherein said finding means comprises comparing means connected to said memory section and to said field value memory area for comparing said stored field value with said particular field values to identify said stored field value as a coincident field value when said stored field value coincides with one of said particular field values and comprises excluding means connected to said comparing means for excluding particular transmission packets from said transmission packets, wherein each of said particular transmission packets includes said coincident field value, and wherein said excluding means thereby finds said particular transmission packets as said particular packets;

specifying means connected to said locating means for specifying subscriber packets in said transmission packets which are not said particular packets, wherein said specifying means comprises an address memory area in which a header address datum of each of said transmission packets is stored as a stored address datum and comprises an address accumulating memory connected to said comparing means and to said address memory area for accumulating, when said stored field value is not said coincident field value, said stored address datum as one of accumulated address data that includes one of said subscriber addresses, whereby said address accumulating memory specifies, as said particular packets, said transmission packets that do not include said accumulated address data; and charge accumulating means connected to said specifying means for accumulating charges by counting said subscriber packets individually in connection with said subscribers.

2. A charging apparatus as claimed in claim 1, wherein said charge accumulating means comprises:

additional comparing means connected to said address memory area and to said address accumulating memory for comparing, when said stored field value is not said coincident field value, said stored address datum with said accumulated address data to identify said stored address datum as a specific one of said accumulated address data that coincides with said stored address datum; and a charge accumulating memory which is related to said address accumulating memory and is connected to said additional comparing means, wherein accumulated counts of said subscriber packets are accumulated in said charge accumulating memory as said charges in correspondence to said accumulated address data and wherein each time said additional comparing means identifies said stored address datum as said specific one of said accumulated address data, an additional count of one is added to a corresponding accumulated count that corresponds to said specific one of said accumulated address data.

3. A charging apparatus as claimed in claim 2, wherein:

said address accumulating memory is additionally loaded with an additional address datum in addition to said accumulated address data when said additional comparing means finds that said additional address datum is stored in said address memory area as said stored address datum and coincides with none of said accumulated address data; and said charge accumulating memory is additionally loaded with an additional count of zero in addition to said accumulated counts in correspondence to said additional address datum.

4. A charging apparatus as claimed in claim 2, wherein:

said address accumulating memory is additionally loaded with an additional address datum in addition to said accumulated address data when said additional comparing means finds that said additional address datum is stored in said address memory area as said stored address datum and coincides with none of said accumulated address data; and said charge accumulating memory is additionally loaded with an additional count of one in addition to said accumulated counts in correspondence to said additional address datum.

5. A charging apparatus which is for use in a local area network used by a plurality of subscribers and through which transmission packets are transmitted, said charging apparatus comprising:

locating means for locating particular packets in said transmission packets;

an address accumulating memory connected to said locating means and to an address memory area for accumulating, when said transmission packets are not said particular packets, stored address datum as one of accumulated address data, wherein said one of accumulated address data includes one of a plurality of subscriber addresses which are contained in said transmission packets and identify said subscribers, whereby said address accumulating memory specifies, as said particular packets, said transmission packets that do not include said accumulated address data; and charge accumulating means connected to said address memory area and said address accumulating memory for accumulating charges by counting subscriber packets individually in connection with said subscribers, wherein said subscriber packets are said transmission packets which include said accumulated address data.

6. A charging apparatus as claimed in claim 5, each of said transmission packets including a type field value, wherein said locating means comprises:

a memory section in which particular field values are preliminarily stored;

extracting means for extracting said type field value from each of said transmission packets as an extracted field value; and finding means connected to said memory section and to said extracting means for finding each of said particular packets in said transmission packets when said extracted field value coincides with one of said particular field values.

7. A charging apparatus as claimed in claim 6, wherein:

said extracting means comprises a field value memory area in which said extracted field value is stored as a stored field value;

said finding means comprising:

comparing means connected to said memory section and to said field value memory area for comparing said stored field value with said particular field values in order to identify said stored field value as a coincident field value when said stored field value coincides with one of said particular field values; and excluding means connected to said comparing means for excluding particular transmission packets from said transmission packets, wherein each of said particular transmission packets includes said coincident field value and wherein said excluding means thereby finds said particular transmission packets as said particular packets.

8. A charging apparatus as claimed in claim 7, wherein said charge accumulating means comprises:

additional comparing means connected to said address memory area and to said address accumulating memory for comparing, when said stored field value is not said coincident field value, said stored address datum with said accumulated address data to identify said stored address datum as a specific one of said accumulated address data that coincides with said stored address datum; and a charge accumulating memory which is related to said address accumulating memory and is connected to said additional comparing means, wherein accumulated counts of said subscriber packets are accumulated in said charge accumulating memory as said charges in correspondence to said accumulated address data and wherein each time said additional comparing means identifies said stored address datum as said specific one of said accumulated address data, an additional count of one is added to a corresponding accumulated count that corresponds to said specific one of said accumulated address data.

9. A charging apparatus as claimed in claim 8, wherein:

said address accumulating memory is additionally loaded with an additional address datum in addition to said accumulated address data when said additional comparing means finds that said additional address datum is stored in said address memory area as said stored address datum and coincides with none of said accumulated address data; and said charge accumulating memory is additionally loaded with an additional count of zero in addition to said accumulated counts in correspondence to said additional address datum.

10. A charging apparatus as claimed in claim 8, wherein:

said address accumulating memory is additionally loaded with an additional address datum in addition to said accumulated address data when said additional comparing means finds that said additional address datum is stored in said address memory area as said stored address datum and coincides with none of said accumulated address data; and said charge accumulating memory is additionally loaded with an additional count of one in addition to said accumulated counts in correspondence to said additional address datum.

* * * * *